3,113,014
METHOD OF PROCESSING WASTE MATERIAL
Herbert S. Foth, Green Bay, Wis., assignor to International Vibro, Incorporated, a corporation of Wisconsin
Filed Sept. 7, 1960, Ser. No. 54,481
3 Claims. (Cl. 71—9)

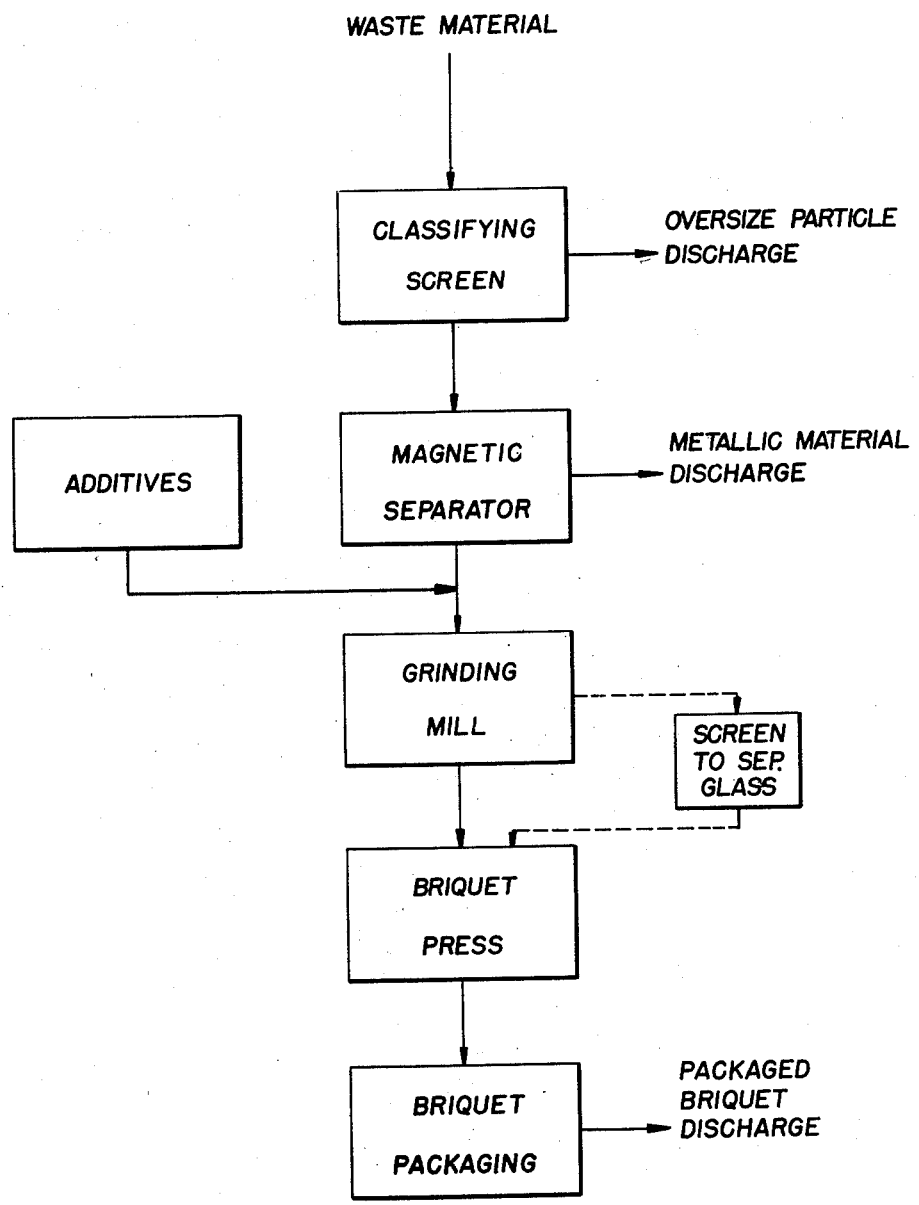

This invention relates to methods for processing waste material, such as garbage, municipal rubbish and the like, and more particularly to a method for processing such material to produce a humus product useful as a soil conditioner.

Municipal wastes such as garbage, rubbish, etc. have long been recognized as a possible source of soil conditioners. Most previous efforts to provide a suitable method for processing such waste material to prepare it for use as a soil conditioner have proven impractical from an economic standpoint. The basic problem presented is one of extracting from the raw bulk material that portion of the material which is most desirable for soil conditioning purposes and further preparing this material for use by eliminating potentially harmful bacteria so that the end product is acceptable from a hygienic standpoint. Destruction of harmful bacteria may be accomplished by subjecting the material to an anaerobic digestion process. This requires that the material be stored under conditions where the material is shielded from exposure to air for a substantial period of time. Unless the anaerobic digestion process is accomplished, the material is unsatisfactory for use as a soil conditioner. This latter point has proved a stumbling block to all processes previously known which were designed to operate on a scale sufficiently large to economically justify the cost of associated apparatus for physically separating undesirable materials such as metal and glass from the raw bulk material.

It is a primary object of the invention to provide a method for processing municipal waste material such as garbage, rubbish or the like to produce, in an efficient and economical manner, hygienically acceptable material for use as a soil conditioner.

It is another object of the invention to provide a method for processing municipal waste material to produce an end product useful as a soil conditioner in a manner such that the end product is relatively clean, simple to handle, and wherein at least part of the process of preparing the material may be performed at or during transit of the material to its point of use.

Other objects and features of the invention will become apparent from the following specification and the drawings.

In the drawings:

FIG. 1 is a schematic flow diagram of a process embodying the invention.

The basic steps of the process are indicated in the flow diagram of FIG. 1. Waste material to be processed is initially discharged onto a classifying screen to separate the material according to the bulk size of individual particles or units. Material which is too large to pass through the classifying screen is discharged to a suitable location and may, in some cases, be passed to a coarse grinder where the oversize particles are broken up into sizes small enough to pass through the initial classifying screen. The size or gauge of the classifying screen is selected in accordance with the capabilities of a grinding mill employed in a subsequent step. Normally, the screen will be of approximately a two inch mesh. The primary purpose of the screen is to make sure that the material fed to the grinding mill is of a size which can be efficiently handled by the mill.

Material which passes through the classifying screen is then subjected to a magnetic separation to remove all iron-containing materials and discharge the magnetizable materials for salvage.

The magnetic separating step of the process may alternatively be performed before the material is passed to the classifying screen if desired. Whether the magnetic separation is performed before or after the classifying step will depend upon the normal composition of the bulk waste material to be processed. In environments where a large amount of relatively large size metallic particles are found in the waste material, it may be more desirable to perform the magnetic separation before the classifying step so that oversized particles which do not pass the classifying screen may be subjected to a coarse grinding operation for subsequent passage through the classifying screen. However, in all cases the two initial steps of the process consist of the classifying as to size by the screen and as to composition by the separation of metallic or magnetizable particles contained in the bulk waste material.

Material which passes through both the classifying screen and the magnetic separating step is then conveyed to a grinding mill in which all of the particles are ground to a minimum size consistent with economical operation. It is frequently desirable to introduce any additives to the waste material prior to the grinding step so that the grinding mill performs both a grinding and mixing function. Since the humus product produced by this process is employed as a soil conditioner various chemicals such as nitrogen or phosphates may be added to the waste material prior to the grinding step in cases where the normal composition of the waste material is deficient. In operations on a municipal scale, the process may conveniently be performed in conjunction with the operation of the municipal sewage treatment plant by admixing sewage sludge with the waste material prior to the passage of the material through the grinding mill.

Material discharged from the grinding mill is fed to a briquet press where the ground material is compressed into units in the form of relatively small briquets. As indicated in FIG. 1, material may be selectively fed directly from the mill to the briquet press or, in cases where an undesirably large percentage of glass particles are present in the waste material, material discharged from the grinding mill may be subjected to another screening step to remove glass particles. In some cases, operation of the grinding mill is such that glass or porcelain particles are reduced to a powder-like consistency, in which case the intermediate screening step between the grinding and pressing operations may be omitted.

Either simultaneously with the compressing of the material into briquets or in a subsequent step, the briquets are packaged or enclosed within a substantially air-tight covering or coating.

The fertilizing effect of humus produced by the foregoing process is extraordinarily valuable and may exceed the value of artificial fertilizers considerably. However, to be of practical value, it is necessary to expose the material discharged from the grinding mill to relatively warm temperatures of approximately 160° F. for a period of time in order to destroy worm particles, disease carrying microbes, weed seeds, etc. A simple storing of the materials under anaerobic conditions is sufficient to produce the desired temperature. However, mere storage of the material requires a considerable period of time to accomplish the desired destruction of undesirable bacteria and hence, when the process is performed on a municipal scale, a considerable amount of bulk storage would be required.

By packaging the briquets in a closed air-tight or substantially air-tight protective coating, such as polyethylene film, treated paper, etc., the anaerobic digestion of organic material takes place relatively quickly while the packaging of the materials eliminates the necessity of providing large capacity drums or containers to hold the material while the anaerobic digestion is taking place. Since the material is enclosed in an air-tight package, the anaerobic digestion process starts shortly after the coating or covering is applied and the material may be transferred from the process site to the point of use immediately after the protective packaging is applied. While the mechanical steps of the process are completed at the completion of the packaging operation, the material continues to work upon itself within its air-tight enclosure for some period of time after the packaging has been applied and the actual completion of the preparation of the material for its end use does not occur until after the anaerobic digestion of the organic materials is completed.

For the most efficient use of the material, it is desirable to expose the material to air upon completion of the anaerobic digestion process so that the aerobic cycle of the material can take place. This action may be conveniently performed by choosing the packaging material to be such that under the conditions encountered—i.e. the temperature generated by anaerobic digestion and exposure of the covering material, the material will disintegrate after a predetermined time interval. The time interval required for complete anaerobic digestion of undesirable materials obviously will vary widely in accordance with the composition of the material and the conditions to which the packaged material is subjected subsequent to the packaging operation. The self-disintegrating action may be achieved in many ways, as by suitable selection of the material of the protective coating; the sealing method or material, or the storage conditions of the packages as by storage under relatively elevated temperatures or by direct exposure to weather.

I claim:
1. The method of processing decomposable organic material comprising the steps of screening the material to separate the larger sized particles from the smaller sized particles, subjecting the smaller sized particles to a magnetic separation to remove metallic particles therefrom, grinding the non-magnetic smaller sized particles, compressing the resulting ground organic material into briquets, completely enclosing the briquets with a substantially air-tight readily disintegratable material, and thereafter digesting anaerobically the organic material in said briquets.

2. The method of claim 1 in which the disintegratable material is polyethylene.

3. The method of processing decomposable organic material comprising the steps of screening the material to separate the larger sized particles from the smaller sized particles, subjecting the smaller sized particles to a magnetic separation to remove metallic particles therefrom, grinding the non-magnetic smaller sized particles, compressing the resulting ground organic material into briquets, completely enclosing the briquets with a substantially air-tight readily disintegratable material, digesting anaerobically the organic material in said briquets, and thereafter exposing the digested material to air to initiate aerobic digestion of said organic material.

References Cited in the file of this patent
UNITED STATES PATENTS

| | | |
|---|---|---|
| 1,459,059 | Krantz | June 19, 1923 |
| 1,938,647 | Earp-Thomas | Dec. 13, 1933 |
| 1,988,307 | Fay | Jan. 15, 1935 |
| 2,019,824 | Liehr | Nov. 5, 1935 |
| 2,049,889 | Boniface | Aug. 4, 1936 |
| 2,091,993 | Jones | Sept. 7, 1937 |
| 2,285,834 | Proctor | June 9, 1942 |
| 2,699,629 | Wandel | Jan. 18, 1955 |
| 2,734,803 | Ruskin | Feb. 14, 1956 |

FOREIGN PATENTS

| | | |
|---|---|---|
| 563,897 | Great Britain | Sept. 5, 1944 |

OTHER REFERENCES

Organic Gardening and Farming, vol. 6, October 1959, p. 26, "For the Suburban Gardener." (Copy in Sci. Lib., SB1071.)